(12) United States Patent  
Baasch et al.

(10) Patent No.: US 9,709,155 B2  
(45) Date of Patent: Jul. 18, 2017

(54) MOTOR ASSEMBLY AND METHOD OF BIASING THE SAME

(71) Applicant: TRICO PRODUCTS CORPORATION, Rochester Hills, MI (US)

(72) Inventors: Oswald Baasch, Bowling Green, KY (US); Danny Brown, Bowling Green, KY (US); Casey Thomas, Russellville, KY (US); Jon Bigley, Bowling Green, KY (US)

(73) Assignee: Trico Products Corporation, Rochester Hills, MI (US)

( * ) Notice: Subject to any disclaimer, the term of this patent is extended or adjusted under 35 U.S.C. 154(b) by 69 days.

(21) Appl. No.: 14/705,129

(22) Filed: May 6, 2015

(65) Prior Publication Data

US 2015/0345612 A1 Dec. 3, 2015

Related U.S. Application Data

(60) Provisional application No. 61/989,119, filed on May 6, 2014.

(51) Int. Cl.
*H02K 7/06* (2006.01)
*F16H 57/023* (2012.01)
(Continued)

(52) U.S. Cl.
CPC ......... *F16H 57/023* (2013.01); *B23K 20/002* (2013.01); *B23K 20/10* (2013.01);
(Continued)

(58) Field of Classification Search
CPC ..... H02K 7/116; H02K 15/02; F16F 57/0213; B23K 20/002
(Continued)

(56) References Cited

U.S. PATENT DOCUMENTS 4,199,861 A 4/1980 Buckman et al.
4,899,432 A 2/1990 Adam et al.
(Continued)

FOREIGN PATENT DOCUMENTS

JP 2000310309 A 11/2000
JP 2009011077 A 1/2009
KR 10-2000-0028196 A 5/2000

OTHER PUBLICATIONS

International Search Report and Written Opinion of the International Searching Authority dated Jul. 23, 2015 for PCT Application No. PCT/US2015/029451.

*Primary Examiner* — Hanh Nguyen
(74) *Attorney, Agent, or Firm* — Miller Canfield

(57) ABSTRACT

A method of biasing a worm shaft of a motor assembly including the steps of: providing a motor assembly having a housing defining an inner chamber, an access aperture spaced therefrom, a shaft aperture in communication with both the chamber and access aperture, and a shaft rotatably supported by and at least partially disposed in the shaft aperture; providing an ultrasonic device having a horn for producing vibrations; providing a slug having a body defining a first shape for being disposed in the access aperture, transformable to a second shape whereby the slug melts in response to predetermined vibrations; placing the slug in the access aperture; actuating the ultrasonic device so as to transform the slug to the second shape such that the slug melts and at least partially flows into the shaft aperture to abut the terminal portion.

15 Claims, 9 Drawing Sheets

(51) Int. Cl.
*F16H 57/021* (2012.01)
*B23K 20/00* (2006.01)
*B23K 20/10* (2006.01)
*H02K 7/116* (2006.01)
*H02K 15/02* (2006.01)
*H02K 7/08* (2006.01)

(52) U.S. Cl.
CPC ......... *B23K 20/106* (2013.01); *F16H 57/021* (2013.01); *H02K 7/116* (2013.01); *H02K 7/1166* (2013.01); *H02K 15/02* (2013.01); *F16H 2057/0213* (2013.01); *H02K 7/081* (2013.01); *Y10T 74/18056* (2015.01); *Y10T 74/1987* (2015.01)

(58) Field of Classification Search
USPC .............. 310/83; 74/400, 409, 425, 24, 434; 29/596
See application file for complete search history.

(56) References Cited

U.S. PATENT DOCUMENTS

| | | | |
|---|---|---|---|
| 5,485,044 A | | 1/1996 | Mackay et al. |
| 5,924,326 A | * | 7/1999 | Fiedler ................ F16C 25/02 74/400 |
| 6,564,666 B1 | | 5/2003 | Marcel |
| 6,805,024 B1 | * | 10/2004 | Shufflebarger .......... F16C 17/10 49/324 |
| 6,843,148 B2 | | 1/2005 | Marcel |
| 7,116,025 B2 | | 10/2006 | Myerly et al. |
| 2003/0172761 A1 | * | 9/2003 | Marcel ................ F16C 17/08 74/425 |
| 2005/0134131 A1 | * | 6/2005 | Myerly ................ H02K 7/081 310/90 |
| 2009/0001829 A1 | | 1/2009 | Uchimura et al. |
| 2009/0095106 A1 | | 4/2009 | Hollender et al. |
| 2015/0345612 A1 | * | 12/2015 | Baasch ................ F16H 57/023 74/25 |

* cited by examiner

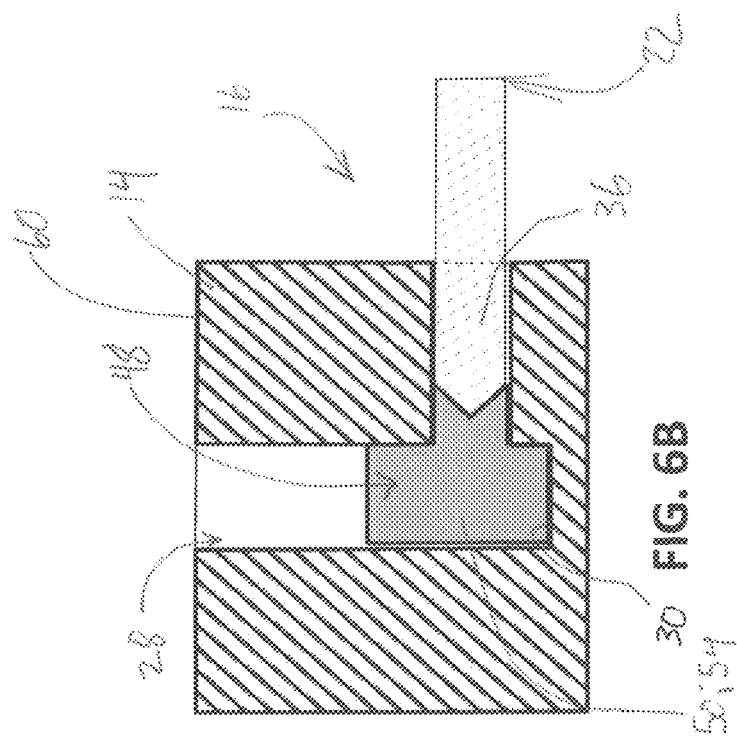
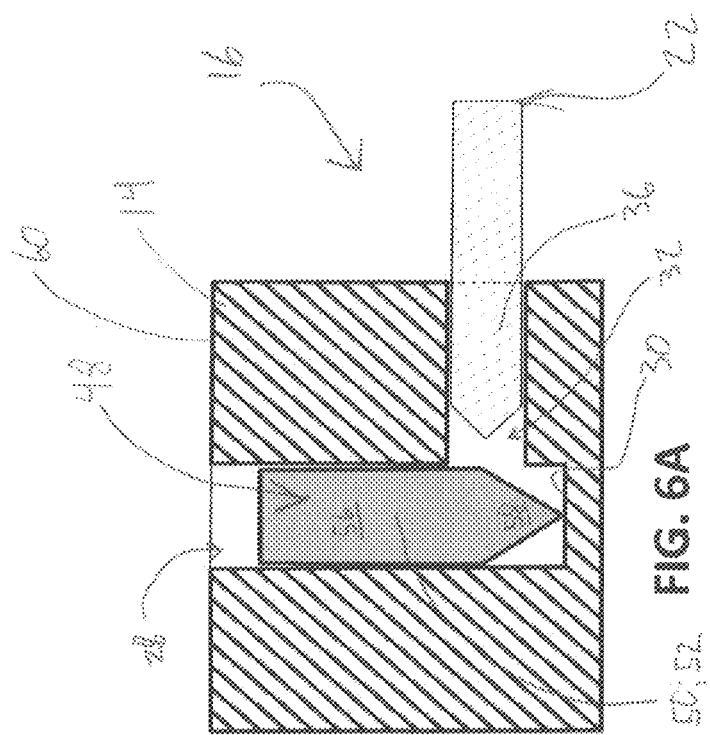

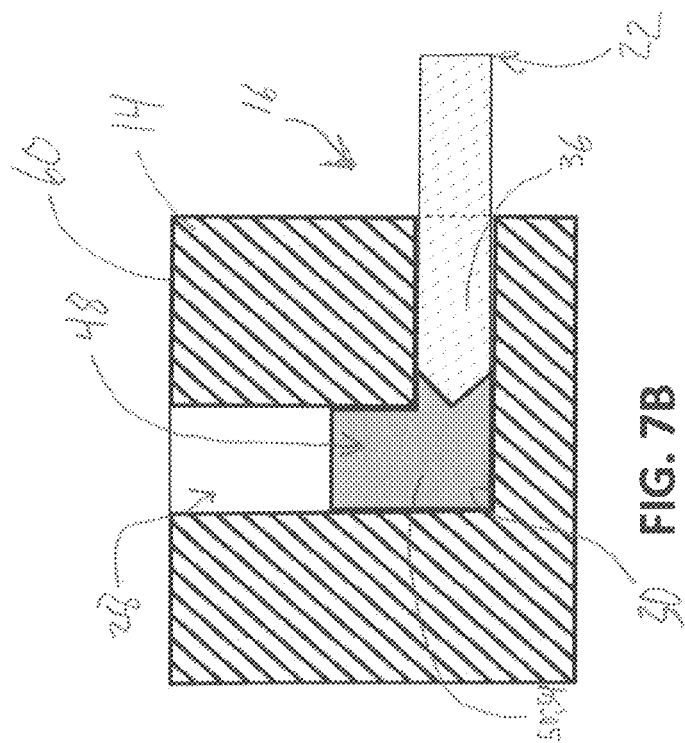
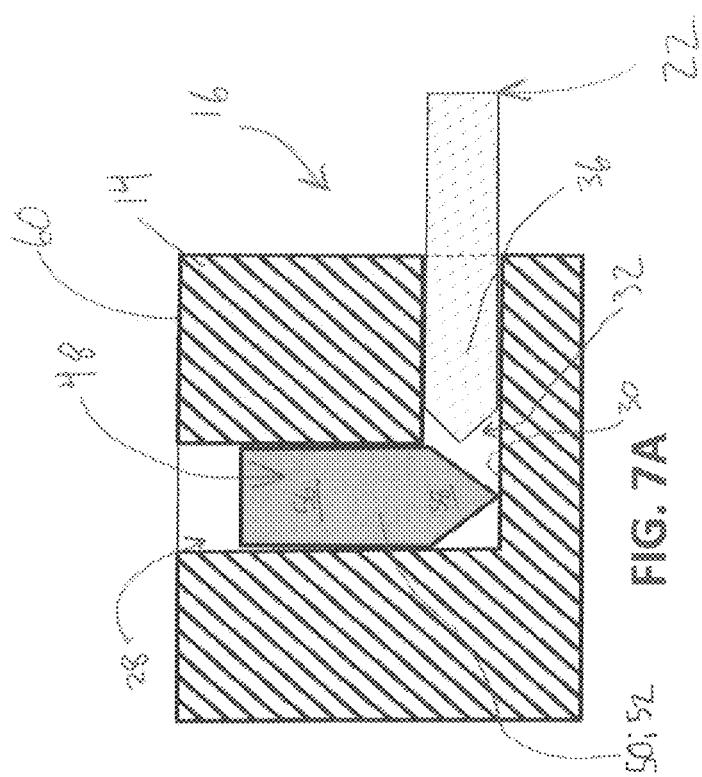
FIG. 7A
FIG. 7B

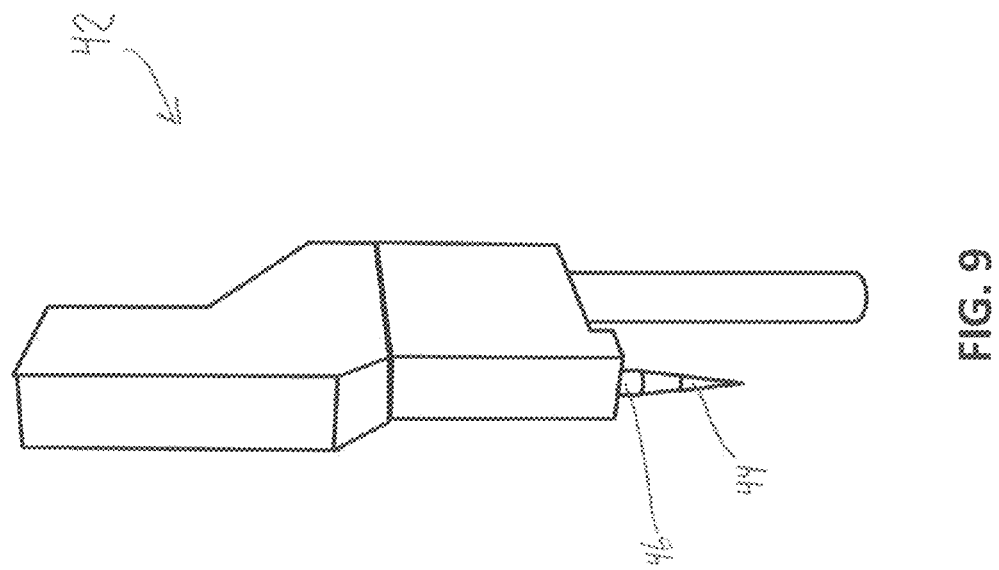

MOTOR ASSEMBLY AND METHOD OF BIASING THE SAME

CROSS-REFERENCE TO RELATED APPLICATION

This application is based upon and claims priority to U.S. Provisional Application No. 61/989,119, filed on May 6, 2014.

BACKGROUND OF INVENTION

1. Field of Invention

The present invention relates generally to motor assemblies and, more specifically, to a method of biasing a worm shaft of a motor assembly.

2. Description of the Related Art

Conventional motor assemblies known in the art include an electric motor mounted to some type of housing in which a geartrain and an output shaft are supported. The geartrain typically converts rotational speed and torque from the electric motor and translates rotation to the output shaft. The geartrain often includes a worm drive with a worm shaft coupled to the electric motor, and a worm gear engaging the worm shaft, whereby the worm gear may be attached to other gears or linkages of the geartrain that are adapted to translate rotation to the output shaft.

Motor assemblies of the type described above are used in a wide variety of applications. As such, the geartrain of the motor assembly can be configured to convert rotation from the electric motor in a number of different ways depending on the application. Moreover, in certain applications, such as those requiring an oscillating rotational output shaft, reliable and consistent performance of motor assemblies is critical. Thus, alignment of the geartrain components is equally important. Specifically, any slack resulting from manufacturing and engagement tolerances of the various components must be eliminated or significantly minimized, as even a slight amount of slack can cause serious performance issues in operation. Further, slack causes backlash, slipping, and wear on the components of the geartrain. As wear increases, slack increases exponentially, which inevitably leads to catastrophic failure of one or more geartrain components. Typically, slack in the geartrain accumulates at the worm shaft and causes the worm shaft to move axially within the housing. Thus, efforts to reduce or eliminate slack known in the art tend to focus on preventing the worm shaft from slipping against the worm gear or moving axially within the housing. To that end, the worm shaft is typically biased during the process of manufacturing the motor assembly, so as to remove slack in the geartrain.

Each of the components of a motor assembly of the type described above must cooperate to effectively translate rotation from the electric motor to the output shaft. In addition, each of the components must be designed not only to facilitate improved performance and efficiency, but also so as to reduce the complexity of manufacturing the motor assembly and removing slack from the geartrain. While the motor assemblies known in the related art have generally performed well for their intended purpose, there remains a need in the art for a method of biasing motor assemblies that have superior operational characteristics and, at the same time, reduces the cost and complexity of biasing the motor assembly.

SUMMARY OF THE INVENTION

The present invention overcomes the disadvantages in the related art in a method of biasing a worm shaft of a motor assembly. The method includes the steps of: providing a motor assembly having a housing defining an inner chamber, an access aperture disposed in the housing and spaced from the inner chamber, a shaft aperture disposed in the housing and in communication with both of the inner chamber and the access aperture, and a worm shaft rotatably supported by the shaft aperture and having a worm portion at least partially disposed in the inner chamber and a terminal portion at least partially disposed in the shaft aperture; providing an ultrasonic welding device having a tapered horn for generating ultrasonic vibrations; providing a slug having a body with a first shape for being disposed in the access aperture of the motor assembly, the body being selectively transformable from the first shape to a different second shape for abutting the terminal portion of the worm shaft in response to receiving concentrated ultrasonic vibrations from the horn of the ultrasonic welding device; installing the slug into the access aperture of the motor assembly; and actuating the ultrasonic welding device so as to transform the body of the slug from the first shape to the second shape such that the slug at least partially melts and at least partially flows into the shaft aperture of the motor assembly so as to abut the terminal portion of the worm shaft and bias the worm shaft along the shaft aperture.

In addition, the present invention is directed toward a wiper motor assembly. The motor assembly includes a housing, a worm shaft, and a slug. The housing defines an inner chamber, and has an access aperture spaced from the inner chamber and a shaft aperture disposed in communication with both the inner chamber and the access aperture. The worm shaft is rotatably supported by the shaft aperture and has a worm portion at least partially disposed in the inner chamber and a terminal portion at least partially disposed in the shaft aperture. The slug is disposed in the access aperture. The slug has a body with a first shape for being disposed in the access aperture, and a different second shape for abutting the terminal portion of the worm shaft. The body is selectively transformable from the first shape to the second shape in response to receiving concentrated ultrasonic vibrations such that the slug at least partially melts and at least partially flows into the shaft aperture so as to bias the worm shaft within the shaft aperture.

In this way, the motor assembly and method of the present invention significantly reduce the cost and complexity of manufacturing motor assemblies that have superior operational characteristics. In addition, the motor assembly and method of the present invention enable simple, reliable, and fast biasing of shafts of motor assemblies.

BRIEF DESCRIPTION OF THE DRAWINGS

Other objects, features, and advantages of the present invention will be readily appreciated as the same becomes better understood after reading the subsequent description taken in connection with the accompanying drawing wherein:

FIG. 6A is an illustrative cross-section of a housing, worm shaft, and a slug in a pre-melted form, according to one embodiment of the present invention.

FIG. 6B is an alternate illustrative cross-section of FIG. 6A showing the slug in a post-melted and re-solidified form.

FIG. 7A is an illustrative cross-section of a housing, worm shaft, and a slug in a pre-melted form, according to one embodiment of the present invention.

FIG. 7B is an alternate illustrative cross-section of FIG. 7A showing the slug in a post-melted and re-solidified form.

FIG. 9 is a partial perspective view of an ultrasonic welding device.

DETAILED DESCRIPTION OF THE INVENTION

Figure 1:
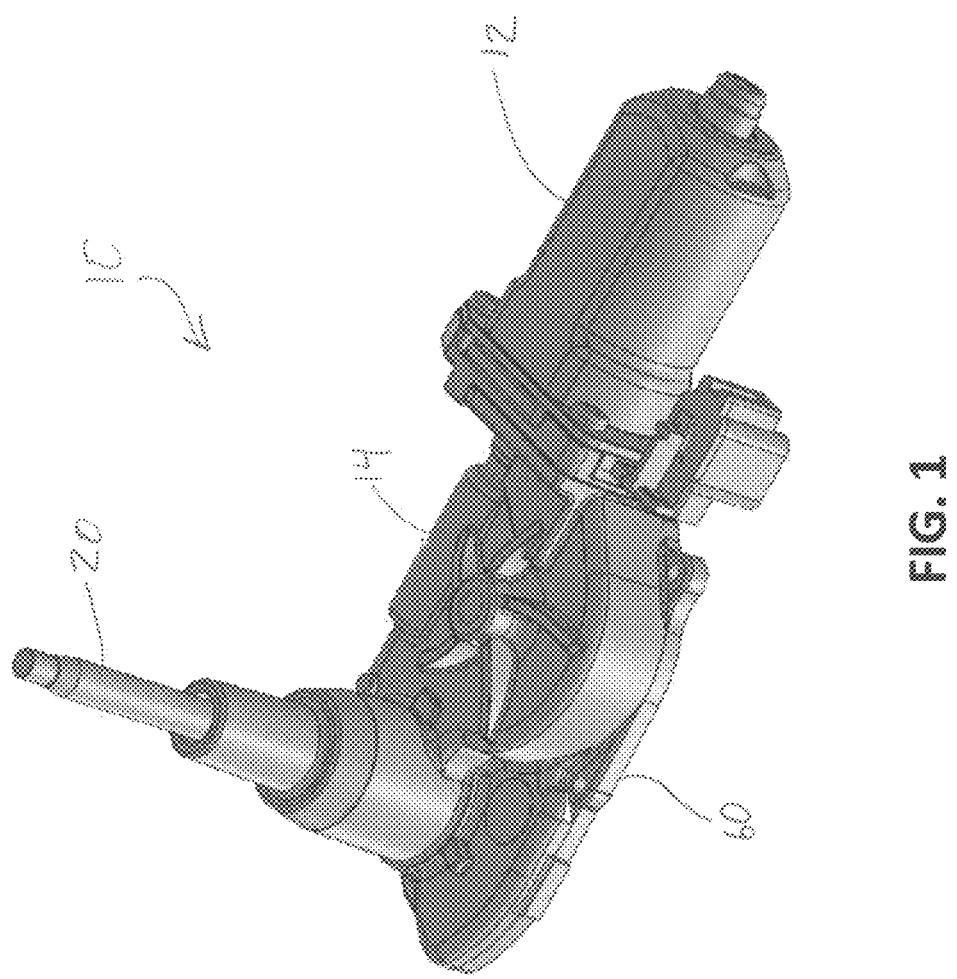
FIG. 1 is an enlarged perspective view of a motor assembly.
Figure 2:
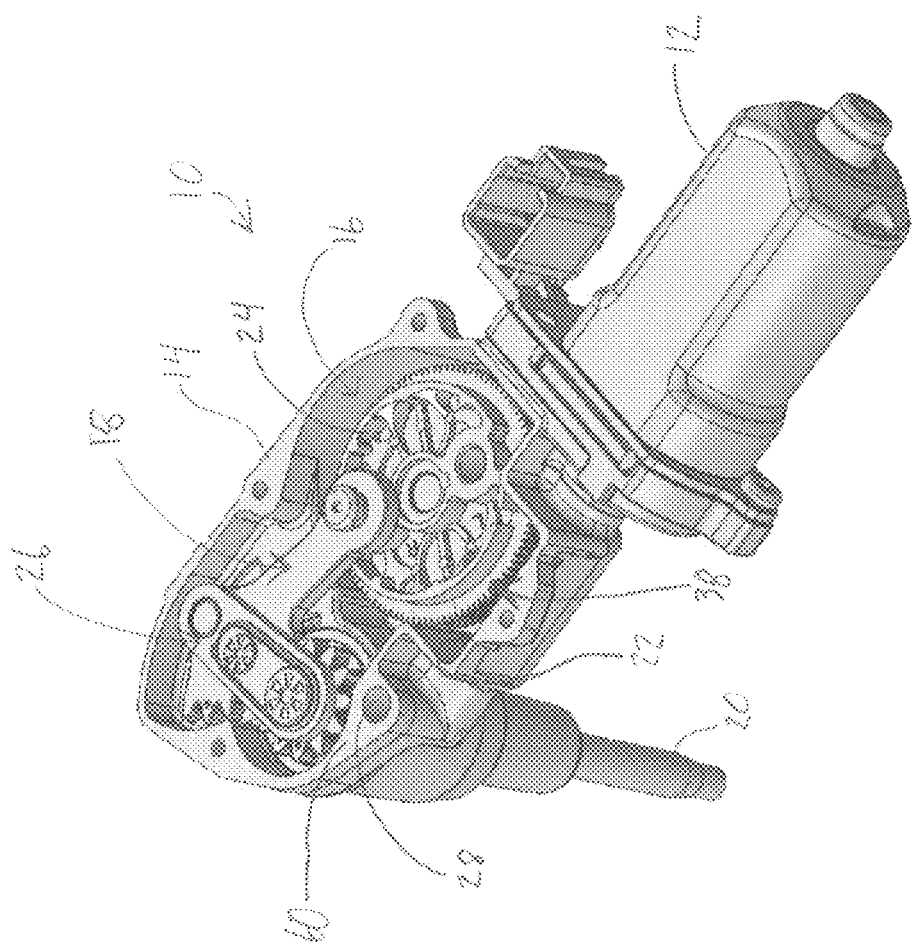
FIG. 2 is a rotated perspective view of the motor assembly of FIG. 1.
Figure 3:
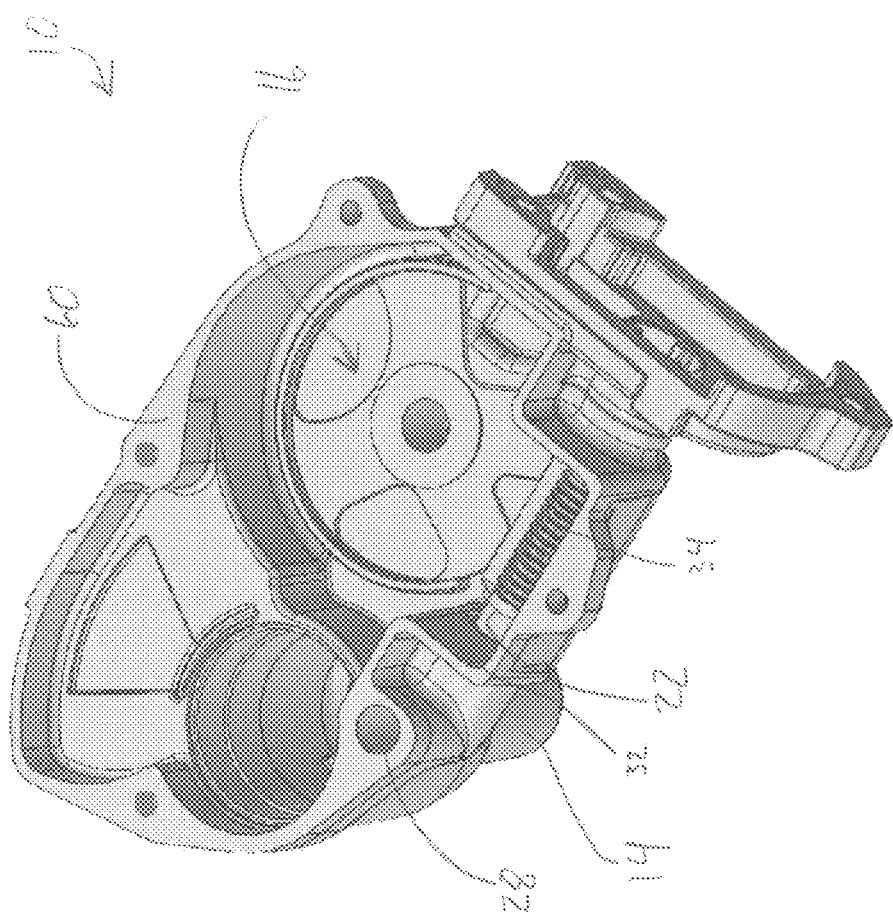
FIG. 3 is an alternate perspective view of the motor assembly of FIG. 2 showing only the housing and worm shaft.
Figure 4:
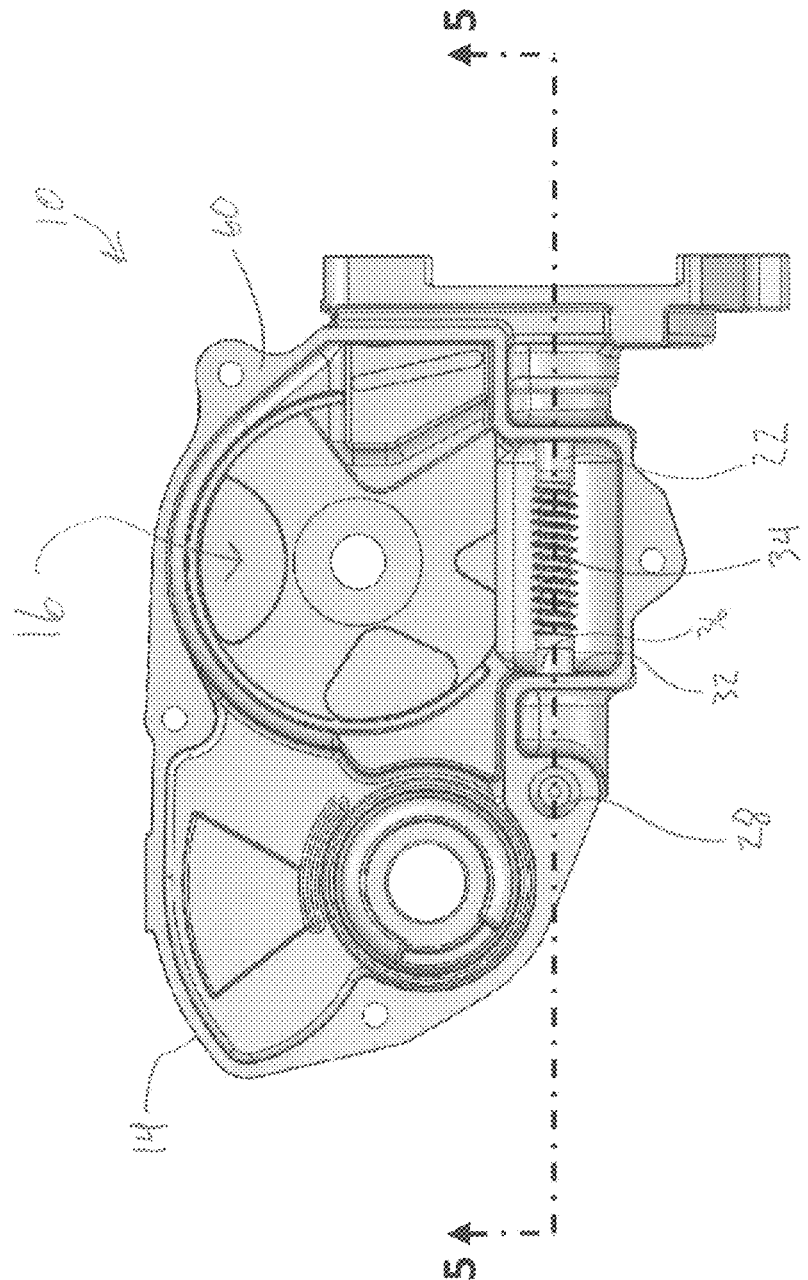
FIG. 4 is an enlarged top plan view of motor assembly of FIG. 3.

Referring now to the figures, where like numerals are used to designate like structure, a motor assembly is shown at 10 in FIGS. 1 and 2. The motor assembly 10 of the present invention 10 includes an electric motor 12 that is operatively attached to a housing 14. The housing 14 defines an inner chamber 16 in which a geartrain, generally indicated at 18, is supported. The geartrain 18 is configured to translate rotation from the electric motor 12 to an output shaft 20. The geartrain 18 includes a worm shaft 22, a worm gear 24, and a linkage, generally indicated at 26. The motor assembly 10 also includes a slug 48. Each of the above components will be described in greater detail below.

The housing 14 is configured to support the various components discussed above and is typically manufactured with an aluminum casting process, whereby the housing 14 may be subsequently machined, drilled, surfaced, etc. after casting. However, those having ordinary skill in the art will appreciate that the housing 14 could be manufactured from any suitable material, using any suitable process, without departing from the scope of the present invention. The electric motor 12 is operatively attached to the housing 14 and is rotatably coupled to the worm shaft 22. As shown, the electric motor 12 is a brushed DC motor. However, those having ordinary skill in the art will appreciate that the electric motor 12 could be any type of motor suitable to operatively attach to the housing 14 and translate rotation to the worm shaft 22 without departing from the scope of the present invention.

As illustrated in FIG. 2, the linkage 26 converts rotation of the worm gear 24 to an oscillating rotation and translates oscillation to the output shaft 20. Those having ordinary skill in the art will appreciate that an oscillating rotational output is used frequently in automotive applications, such as in wiper systems. However, it will be appreciated that the specific configuration of the linkage 26 forms no part of the present invention. As such, those having ordinary skill in the art will appreciate that the motor assembly 10 could have a linkage 26 configured differently, or omitted entirely, without departing from the scope of the present invention. Moreover, as will be appreciated from the subsequent description below, the teachings of present invention can be applied to motor assemblies 10 having a variety of different configurations, orientations, and applications.

Figure 5:
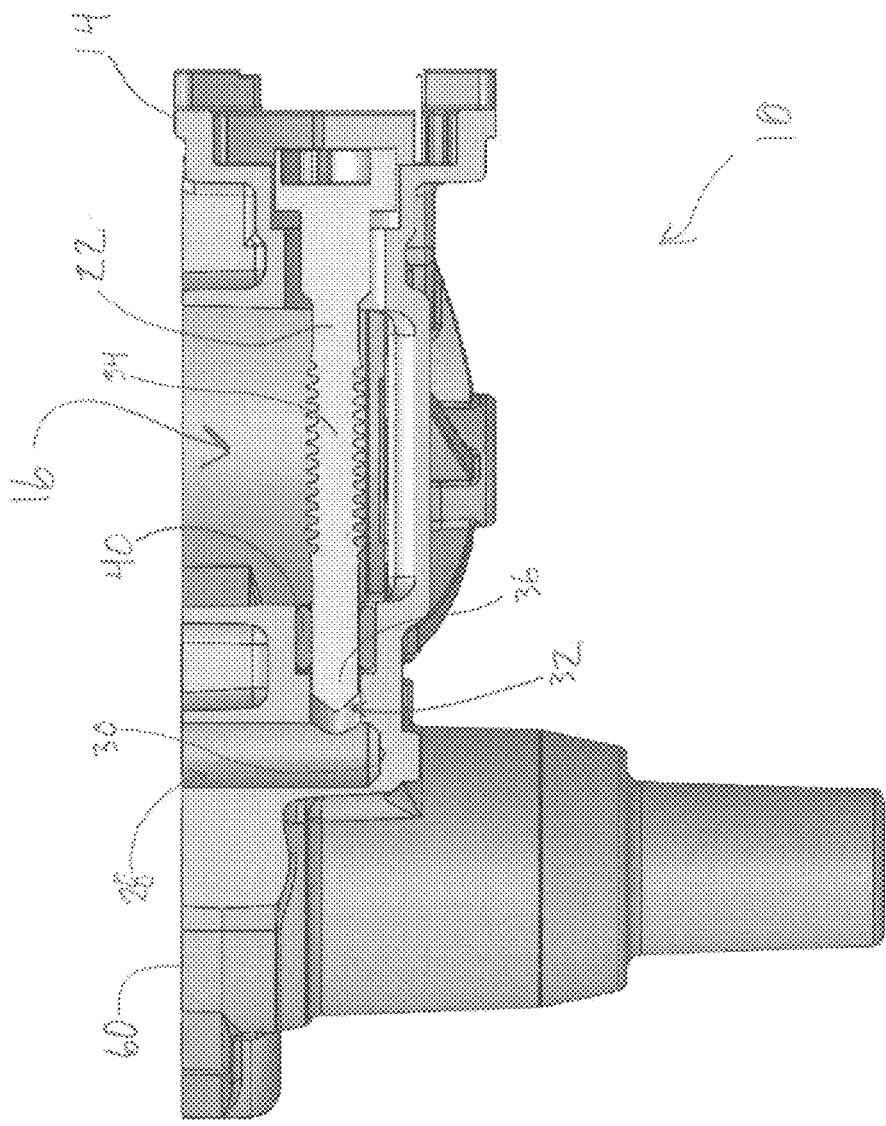
FIG. 5 is a sectional view taken along line 5-5 of FIG. 4.
Figure 8B:
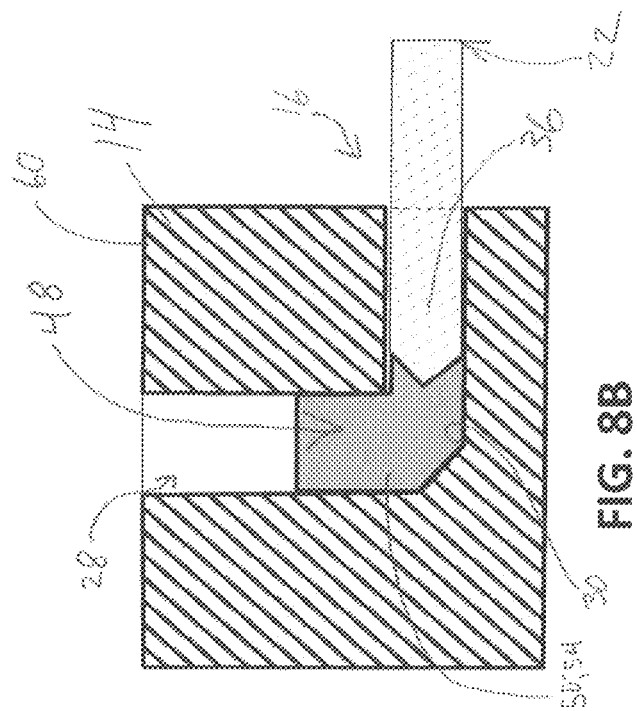
FIG. 8B is an alternate illustrative cross-section of FIG. 8A showing the slug in a post-melted and re-solidified form.
Figure 8A:
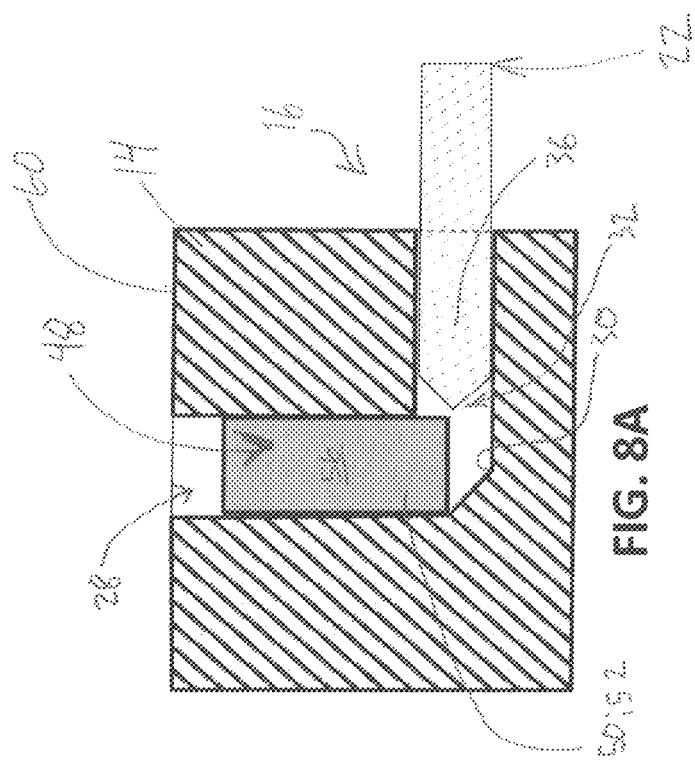
FIG. 8A is an illustrative cross-section of a housing, worm shaft, and a slug in a pre-melted form, according to one embodiment of the present invention.

Referring now to FIGS. 2-5, the housing 14 includes an access aperture 28 disposed therein. The access aperture 28 is spaced from the inner chamber 16 and extends to a predetermined depth 30, as discussed in greater detail below. As shown best in FIG. 5, a shaft aperture 32 is disposed in the housing 14 and is in communication with both the inner chamber 16 and the access aperture 28. The worm shaft 22 is rotatably supported by the shaft aperture 32 and is in rotational communication with the electric motor 12. More specifically, the worm shaft 22 is coupled to the electric motor 12. However, those having ordinary skill in the art will appreciate that the worm shaft 22 could be in rotational communication with the electric motor 12 in any suitable way without departing from the scope of the present invention. The worm shaft 22 has a worm portion 34 and a terminal portion 36. The worm portion 34 is at least partially disposed in the inner chamber 16 and engages the worm gear 24 to define a worm drive 38. The terminal portion 36 is at least partially disposed in the shaft aperture 32. As shown in FIG. 5, the terminal portion 36 has a conical profile. However, those having ordinary skill in the art will appreciate that the terminal portion 36 could have any suitable profile without departing from the scope of the present invention. More specifically, it is conceivable that the terminal portion 36 of the worm shaft 22 could have a cylindrical profile, without any conical structure or taper, without departing from the scope of the present invention. The worm gear 24 is rotatably supported by the housing 14, is disposed in the inner chamber 16, and translates rotation to the linkage 26 as discussed above.

As shown in FIG. 5, the worm shaft 22 may be at least partially supported by a bearing 40 aligned concentrically with the shaft aperture 32 and disposed in the housing 14. The terminal portion 36 of the worm shaft 22 is spaced from the bearing 40 and the inner chamber 16 of the housing 14. However, those having ordinary skill in the art will appreciate that the bearing 40 could be positioned or configured differently, or could be omitted entirely, without departing from the scope of the present invention.

Referring now to FIG. 9, an ultrasonic welding device 42 configured to produce ultrasonic vibrations is shown. The ultrasonic welding device 42 includes a tapered horn 44. As described in greater detail below, the tapered horn 44 has a profile that is sized and configured to interact with the access aperture 28 of the housing 14 of the motor assembly 10. The ultrasonic welding device 42 may include a securing station (not shown, but known in the art) for holding the motor assembly 10 so as to align the horn 44 with the access aperture 28. In one embodiment, the horn 44 may be mounted to a ram 46 configured to move the horn 44 at least partially into the access aperture 28 of the housing 14. Those having ordinary skill in the art will appreciate that the ram 46 could be actuated using any suitable linear actuating technology. By way of non-limiting example, the ram 46 could be pneumatic, hydraulic, or electric. Moreover, the ram 46 may also include a force measurement device (not shown, but generally known in the art), such as a load cell in communication with the horn 44, so as to provide information concerning the force exerted by the ram 46. The ultrasonic welding device 42 also typically includes a sonic driver (not shown in detail, but generally known in the art) in communication with the horn 44 and configured to generate concentrated ultrasonic vibrations transmitted to the horn 44. Those having ordinary skill in the art will appreciate that the ultrasonic welding device 42 described herein could have a number of suitable configurations, could be controlled in any suitable way, and could have any suitable number of input or control parameters, adjustable to any suitable range or setting, without departing from the scope of the present invention.

As discussed above, the motor assembly 10 also includes a slug 48 disposed in the access aperture 28 of the housing 14. The slug cooperates with the motor assembly 10 and the ultrasonic welding device 42 as discussed more thoroughly below. Referring now to FIGS. 6A-8B, the slug 48 has a body 50 that is transformable between a first shape 52 (see FIGS. 6A, 7A, and 8A) and a second shape 54 (see FIGS. 6B, 7B, and 8B) in response to predetermined vibration exposure. The first shape 52 and the second shape 54 are described in greater detail below.

The first shape 52 is configured to be disposed in the access aperture 28 of the housing 14 of the motor assembly 10. The body 50 of the slug 48 is configured to transform from the first shape 50 to the second shape 54 such that the slug 48 at least partially melts in response to a predetermined vibration exposure from the horn 44 of the ultrasonic welding device 42. Specifically, during assembly, the slug 48 is placed in the access aperture 28 of the housing 14 of the motor assembly 10, and the ultrasonic welding device 42 is subsequently actuated so as to impart concentrated ultrasonic vibrations into the slug 48 whereby the body 50 of the slug 48 transforms from the first shape 52 to the second shape 54. In response, the slug 48 at least partially melts and at least partially flows into the shaft aperture 32 of the housing 14 of the motor assembly 10 so as to abut the terminal portion 36 of the worm shaft 22 thereby biasing the worm shaft 22 within the shaft aperture 32 of the housing 44 of the motor assembly 10. It will be appreciated that the second shape 54 of the body 50 of the slug 48 is ultimately defined by several factors discussed in greater detail below. However, those having ordinary skill in the art will appreciate that the second shape 54 of the body 50 of the slug 48 could have any suitable profile, size, shape, or configuration sufficient to abut the terminal portion 36 of the worm shaft 22 of the geartrain 18 of the motor assembly 10 without departing from the scope of the present invention. Moreover, the first shape 52 of the body 50 of the slug 48 could have any suitable profile, size, shape, or configuration sufficient to be disposed in the access aperture 28 of the housing 14 of the motor assembly without departing from the scope of the present invention.

Further, in addition to imparting concentrated ultrasonic vibrations to the slug 48, the ultrasonic welding device 42 may also displace the slug 48 downward into the access aperture 28 in operation with the ram 46. It will be appreciated that the ram 46 could be actuated before, during, or after the ultrasonic welding device 42 imparts concentrated ultrasonic vibrations to the slug 48, or could be omitted entirely, without departing from the scope of the present invention. To that end, force produced by the ram 46 of the ultrasonic welding device 42 may decrease the amount of time required to transform the body 50 of the slug 48 from the first shape 52 to the second shape 54, or otherwise facilitate or influence the ultimate geometry of the second shape 54 of the body 50 of the slug 48. It will be appreciated that force produced by the ram 46 could vary with, or be independent of, the ultrasonic vibration cycle, without departing from the scope of the present invention.

It will be appreciated that the first shape 52 of the body 50 of the slug 48 is configured to cooperate with both the access aperture 28 and the shaft aperture 32. Specifically, the first shape 52 of the body 50 of the slug 48 has geometry that enables the slug 48 to be placed in the access aperture 28 of the housing 14, and whereby the geometry of the first shape 52 of the body 50 of the slug 48 is configured to optimize the speed and efficiency of the transformation to the second shape 54 given the specific orientation and configuration of the access aperture 28, the shaft aperture 32, the housing 14, and the tapered horn 44. By way of example, as shown best in FIGS. 6A, 7A, and 8A, where the slug 48 and access aperture 28 have round profiles, the slug 48 has a smaller diameter than the access aperture 28. However, those having ordinary skill in the art will appreciate that the slug 28 and access aperture 28 could have any suitable profile sufficient to enable the slug 48 to be disposed in the access aperture 28 without departing from the scope of the present invention. Moreover, in one embodiment, the first shape 52 of the body 50 of the slug 48 may include a cylindrical portion 56 and a conical portion 58 (see FIGS. 6A and 7A). It will be appreciated that the conical portion 58 is configured to facilitate quick melting of the slug 48 in response to predetermined vibration exposure, as discussed above. While the first shape 52 of the body 50 of the slug 48 is shown having a single conical portion 58 and a cylindrical portion 56 having a constant diameter, and thus defining an asymmetric profile, those having ordinary skill in the art will appreciate that the first shape 52 of the body 50 of the slug 48 could have a symmetric profile without departing from the scope of the present invention. Moreover, first shape 52 of the body 50 of the slug 48 could omit a conical portion 58 altogether (see FIG. 8A), or could conceivably omit a discreet cylindrical portion 56, without departing from the scope of the present invention.

Referring now to FIGS. 6A-8B, as discussed above, the access aperture 28 and the shaft aperture 32 are in communication with each other so as to allow the molten slug 48 to at least partially flow into the shaft aperture 32 and at least partially abut the terminal portion 36 of the worm shaft 22. It will be appreciated that the depth 30 of the access aperture 28 in relation the position of the shaft aperture 32 may be adjusted, along with the geometry of the first shape 52 of the body 50 of the slug 48, so as to optimize the flow of the molten slug 48 into the shaft aperture 32, as discussed above (see FIGS. 6A and 7A). Moreover, it will be appreciated that the shaft aperture 32 and the access aperture 28 could be formed in the housing 14 in different ways, such as at different intersecting positions, depths, or angles. Thus, depending on the tooling or process used to form the shaft aperture 3 and the access aperture 28, the geometry of the first shape 52 of the body 50 of the slug 48 may be adjusted accordingly to cooperate. Specifically, where the depth 30 of the access aperture 28 is spaced from the shaft aperture 32 (see FIG. 6A), the first shape 52 of the body 50 of the slug 48 may be longer than when the depth 30 of the access aperture 28 aligns with the shaft aperture 32 (see FIGS. 7A and 8A).

As shown in FIGS. 5-8A, the access aperture 28 and the shaft aperture 32 define a right angle therebetween. It will be appreciated that this arrangement allows the housing 14 to be manufactured without necessitating complex machinery and tooling, whereby the access aperture 28 is formed perpendicularly to a sealing surface GO of the housing 14. However, it is conceivable that the access aperture 28 and shaft aperture 32 could be formed in the housing 14 so as to define any suitable transverse angle therebetween without departing from the scope of the present invention. Nevertheless, it will be appreciated that the arrangement between the access aperture 28 and the shaft aperture 32, as discussed above, enables the housing 14 to be sealed using a single cover (not shown, but generally known in the art) so as to prevent water ingress in operation, and that an additional cover, seal, plug, plate, etc. is not required to seal the access aperture 28.

During the assembly process, it will be appreciated that the slug 48 could be placed in the access aperture 28 of the housing 14 at any suitable time prior to biasing. Moreover, it will be appreciated that the electric motor 12 could be energized while the output shaft 20 is otherwise restricted from moving so as to pre-load the geartrain 18 and transfer any slack in the motor assembly 10 to the worm shaft 22. Thus, it will be appreciated that pre-loading the geartrain 18 in this way before the body 50 of the slug 48 transforms to the second shape 54 simultaneously optimizes the reduction of slack and facilitates optimum biasing of the worm shaft 22 in the housing 14.

In this way, the various component of the present invention cooperate to enable worm shaft 22 of the motor assembly 10 to be biased in a fast, simple, and reliable way. Further, those having ordinary skill in the art will appreciate that the present invention allows the worm shaft 22 to be biased without necessitating multiple sealing components. Further, it will be appreciated that the present invention leads to a decrease in manufacturing and assembly costs, as expensive injection molding systems need not be utilized.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A method of biasing a worm shaft of a motor assembly, said method comprising the steps of:
   providing a motor assembly having a housing defining an inner chamber, an access aperture disposed in said housing and spaced from said inner chamber, a shaft aperture disposed in said housing and in communication with both of said inner chamber and said access aperture, and a worm shaft rotatably supported by said shaft aperture and having a worm portion at least partially disposed in said inner chamber and a terminal portion at least partially disposed in said shaft aperture;
   providing an ultrasonic welding device having a tapered horn for generating ultrasonic vibrations;
   providing a slug having a body with a first shape for being disposed in said access aperture of said motor assembly, said body being selectively transformable from said first shape to a different second shape for abutting said terminal portion of said worm shaft in response to receiving concentrated ultrasonic vibrations from said horn of said ultrasonic welding device;
   installing said slug into said access aperture of said motor assembly; and
   actuating said ultrasonic welding device so as to transform said body of said slug from said first shape to said second shape such that said slug at least partially melts and at least partially flows into said shaft aperture of said motor assembly so as to abut said terminal portion of said worm shaft and bias said worm shaft along said shaft aperture.

2. The method as set forth in claim 1, further including the step of de-actuating said ultrasonic welding device after said slug abuts said terminal portion of said worm shaft such that said slug solidifies in said second shape after concentrated ultrasonic vibrations cease.

3. The method as set forth in claim 1, wherein said first shape of said body of said slug has a conical portion; and further including the step of positioning said conical portion of said slug adjacent to said shaft aperture.

4. The method as set forth in claim 1, further including the step of positioning said horn of said ultrasonic welding device adjacent to said slug.

5. The method as set forth in claim 1, wherein said step of actuating said ultrasonic welding device includes simultaneously: imparting concentrated ultrasonic vibrations to said slug, and displacing said slug into said access aperture.

6. The method as set forth in claim 1, wherein said motor assembly further includes an electric motor for translating rotational torque to said worm shaft, and an output shaft disposed in rotational communication with said worm shaft; and further including the steps of:
   holding said output shaft so as to substantially prevent rotational movement thereof; and
   driving said electric motor such that said terminal portion of said worm shaft is biased away from said slug along said shaft aperture.

7. A motor assembly comprising:
   a housing defining an inner chamber, said housing having an access aperture spaced from said inner chamber, and a shaft aperture disposed in communication with both said inner chamber and said access aperture;
   a worm shaft rotatably supported by said shaft aperture and having a worm portion at least partially disposed in said inner chamber and a terminal portion at least partially disposed in said shaft aperture; and
   a slug disposed in said access aperture, said slug having a body with a first shape for being disposed in said access aperture, and a different second shape for abutting said terminal portion of said worm shaft, said body being selectively transformable from said first shape to said second shape in response to receiving concentrated ultrasonic vibrations such that said slug at least partially melts and at least partially flows into said shaft aperture so as to bias said worm shaft within said shaft aperture.

8. The motor assembly as set forth in claim 7, wherein said access aperture and said shaft aperture intersect at a right angle.

9. The motor assembly as set forth in claim 7, wherein said access aperture of said housing extends to a predetermined depth spaced below said shaft aperture.

10. The motor assembly as set forth in claim 7, wherein said access aperture of said housing extends to a predetermined depth at least partially aligned with said shaft aperture.

11. The motor assembly as set forth in claim 7, wherein said first shape of said body of said slug has an asymmetric profile.

12. The motor assembly as set forth in claim 7, wherein said first shape of said body of said slug has a conical portion.

13. The motor assembly as set forth in claim 12, further including a geartrain supported in said inner chamber of said housing and disposed in communication with said worm shaft, and an output shaft disposed in communication with said geartrain such that rotational torque from said electric motor is translated into oscillating rotation of said output shaft.

14. The motor assembly as set forth in claim 7, further including an electric motor for translating rotational torque to said worm shaft.

15. The motor assembly as set forth in claim 14, wherein said output shaft is substantially parallel to said access aperture of said housing.

\* \* \* \* \*